(12) United States Patent
Wagner et al.

(10) Patent No.: US 9,395,206 B2
(45) Date of Patent: Jul. 19, 2016

(54) METHOD AND DEVICE FOR ASCERTAINING A PHYSICAL VARIABLE IN A POSITION TRANSDUCER SYSTEM

(71) Applicants: Alexandre Wagner, Stuttgart (DE); Ralf Buehrle, Hochberg (DE)

(72) Inventors: Alexandre Wagner, Stuttgart (DE); Ralf Buehrle, Hochberg (DE)

(73) Assignee: Robert Bosch GmbH, Stuttgart (DE)

( * ) Notice: Subject to any disclaimer, the term of this patent is extended or adjusted under 35 U.S.C. 154(b) by 534 days.

(21) Appl. No.: 13/908,287

(22) Filed: Jun. 3, 2013

(65) Prior Publication Data
US 2013/0325384 A1    Dec. 5, 2013

(30) Foreign Application Priority Data
Jun. 4, 2012    (DE) .......................... 10 2012 209 375

(51) Int. Cl.
*G01C 25/00* (2006.01)
*G01D 21/00* (2006.01)
*G05B 17/02* (2006.01)

(52) U.S. Cl.
CPC .............. *G01C 25/00* (2013.01); *G01D 21/00* (2013.01); *G05B 17/02* (2013.01)

(58) Field of Classification Search
CPC ......... G01C 25/00; G01D 21/00; G05B 17/02
USPC .................... 702/33, 60, 86, 94, 105, 154; 123/568.21, 674; 701/102, 103, 108; 700/282
See application file for complete search history.

(56) References Cited

U.S. PATENT DOCUMENTS 6,668,214 B2 * 12/2003 Yasui .................. F02D 35/0007
                                                              123/674

* cited by examiner

*Primary Examiner* — John H Le
(74) *Attorney, Agent, or Firm* — Norton Rose Fulbright US LLP

(57) ABSTRACT

A method for ascertaining a value of a physical variable in a position transducer system includes the steps of providing a computation model, which maps a response of the position transducer system, wherein the computation model includes a model function and one or multiple parameter(s); ascertaining a value of at least one system variable at one or multiple points in time; determining the parameters of the computation model from one or multiple value(s) of the at least one system variable determined at different points in time; and determining the value of the physical variable as a function of the one or the multiple determined parameters.

18 Claims, 2 Drawing Sheets

METHOD AND DEVICE FOR ASCERTAINING A PHYSICAL VARIABLE IN A POSITION TRANSDUCER SYSTEM

CROSS REFERENCE TO RELATED APPLICATION

The present application claims priority to Application No. DE 10 2012 209 375.3, filed in the Federal Republic of Germany on Jun. 4, 2012, which is expressly incorporated herein in its entirety by reference thereto.

FIELD OF INVENTION

The present invention relates to position transducer systems, in particular methods of ascertaining a physical variable in such position transducer systems.

BACKGROUND INFORMATION

For operation of position transducer systems, in particular for their use in regulating systems, information about one or more physical variables is required in real time. However, providing sensors for detecting each physical variable required would be very complex and it would not always be possible due to structural restrictions to provide a separate sensor for detecting each physical variable required.

In electromechanical position transducer systems, for example, knowledge about a current through the electromechanical converter, i.e., actuator, is necessary since an ohmic resistance and a temperature of the actuator may be deduced from that. For systems in which no current sensor is provided, only inadequately accurate estimation models are known which have large tolerances. Position transducer systems having an electromechanical converter which is operated without a current sensor must therefore in particular have a very conservative design. This is a disadvantage from the standpoint of performance, installation space and cost considerations.

SUMMARY

According to the present invention, a method for determining a physical variable in a position transducer system and a device, a position transducer system, a computer program and a computer program product are provided.

According to a first aspect, a method for ascertaining a value of a physical variable in a position transducer system is provided. This method includes the following steps:
  providing a computation model, which maps a behavior of the position transducer system, the computation model including a model function and one or multiple parameter(s);
  ascertaining a value of at least one system variable at one or multiple points in time;
  determining the parameters of the computation model from one or multiple value(s) of the at least one system variable ascertained at different points in time;
  determining the value of the physical variable as a function of the one or the multiple determined parameter(s).

One idea of the above method is to determine parameters of a computation model, which describes the position transducer system, and to ascertain the physical variable from the parameters thereby determined. This procedure is based on the observation that in nonlinear position transducer systems in particular, the parameters are not constant but instead depend on one or multiple physical variable(s). It is possible in this way to determine physical variables in particular in systems in which a real-time parameter determination is used, by simple analysis of the parameters ascertained in real time without having to use a corresponding sensor.

In addition, a position of the actuator and/or an electric trigger variable, in particular a trigger voltage of a position transducer drive of the position transducer system, may be used as the one or the multiple system variable(s).

According to one exemplary embodiment, a temperature or a current may be determined as a physical variable in a position transducer drive of the position transducer system.

In addition, the parameters may be determined again at regular intervals, in particular in real time.

According to one exemplary embodiment, the physical variable may be determined from the determined parameters with the aid of an allocation function.

One or multiple additional physical variable(s) may be determined from the one or the multiple parameter(s), the physical variable to be determined being determined with the aid of the additional physical variables and a discretized linear differential equation.

According to another aspect, a device, in particular an arithmetic unit, is provided for ascertaining a value of a physical variable in a position transducer system, the device being designed to
  provide a computation model, which maps a response of the position transducer system, the computation model including a model function and one or multiple parameter(s);
  ascertain a value of at least one system variable at one or multiple points in time;
  determine the parameters of the computation model from one or multiple value(s) of the at least one system variable ascertained at different points in time;
  determine the value of the physical variable, as a function of the one or the multiple determined parameter(s).

According to another aspect, a computer program having program code means is provided to carry out all steps of the above method when the computer program is executed on a computer or a corresponding arithmetic unit, in particular in the above device.

According to another aspect, a computer program product containing program code which is stored on a computer-readable data medium is provided, and which, when it is executed on a data processing system, carries out the above method.

BRIEF DESCRIPTION OF THE DRAWINGS

Preferred exemplary embodiments of the present invention are explained in greater detail below on the basis of the accompanying drawings.

DETAILED DESCRIPTION

Figure 1:
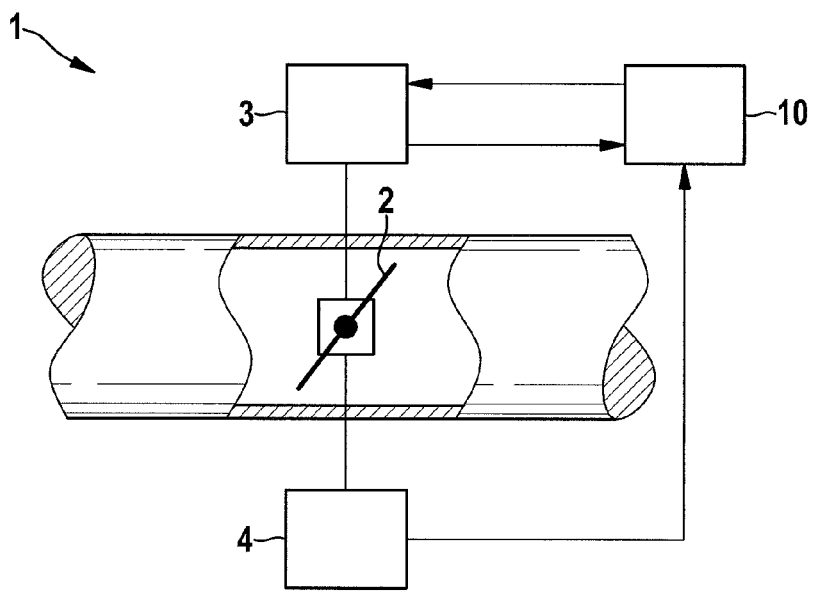
FIG. 1 shows a schematic representation of a throttle valve position transducer as a position transducer system in which a physical variable is to be determined.

FIG. 1 shows a position transducer system 1 for adjusting the position of an actuator 2. The method for ascertaining a physical variable, which is not detected by a corresponding sensor, in position transducer system 1 is described below on the basis of a throttle valve position transducer, which is able to adjust a throttle valve as an actuator 2. However, it is also possible to use the method described below for other position transducer systems whose physical response is describable by nonlinear differential equations to determine a physical variable.

Actuator 2 is moved with the aid of a position transducer drive 3. Position transducer drive 3 may be designed as an electromechanical actuator, which may be designed as a dc motor, an electronically commutated motor or a stepping motor, for example. Position transducer drive 3 may be supplied with electric current from a supply source (not shown). With the aid of a position sensor 4, the position actually assumed by actuator 2 may be detected and analyzed.

Position transducer drive 3 is triggered with the aid of a control unit 10 to approach a certain position of actuator 2 through a suitable current feed. For carrying out a position control for actuator 2, control unit 10 receives feedback from position sensor 4 about the instantaneous position, i.e., the actual position, of actuator 2. In addition, control unit 10 may receive information about an actuating torque, for example, current information about the current picked up by position transducer drive 3.

In particular when using an observer model for the position control but also for a diagnosis of the position control, a computation model may be implemented for the physical position transducer system 1 in control unit 10. For example, the positioning rate of position transducer system 1 may also be calculated on the basis of a computation model if the position signal, which is provided by position sensor 4, has a resolution too low for a derivation. Furthermore, in particular for operation of the system as a whole in sensitive ranges, it may be necessary to carry out a monitoring of the function of position transducer system 1 by carrying out a plausibility check of the function of position transducer system 1 with the aid of the computation model.

The following equations are used for modeling of the above position transducer system 1 having a dc motor as position transducer drive 3:

$$U = RI + L\dot{I} + C_m K_{gear} \dot{\varphi}$$

$$J\ddot{\varphi} = C_{in} K_{gear} I - M_s(\varphi) - M_f(\dot{\varphi}) - A(p_{pre} - p_{post})$$

where variables R each correspond to a winding resistance of electromechanical position transducer drive 3, L corresponds to an inductance of a winding of electromechanical position transducer drive 3, I corresponds to a position transducer current through position transducer drive 3, and $C_m$ is an engine constant and $K_{gear}$ is a gear ratio, which may indicate the actuating torque as a function of position transducer current I. Furthermore, U corresponds to the voltage applied to the electromechanical position transducer drive of the position transducer system and $\varphi$ corresponds to the instantaneous position of actuator 2.

Challenges for modeling a model equation, which describes position transducer system 1 with the greatest possible physical accuracy, include in particular the description of friction $M_f(\dot{\varphi})$ and restoring moment $M_s(\varphi)$, which is exerted by a return spring for actuator 2 when the return spring has a nonlinear response.

Term $A(p_{pre} - p_{post})$ describes a moment exerted on actuator 2 by a pressure difference across actuator 2. In the case of a throttle valve having a central suspension, this term may be assumed to be 0 since the effective pressure acts equally on both halves of the throttle valve. Other disturbing moments could also be taken into account by adding a predefined $M_{stör}$.

In contrast with previous physical modelings of position transducer systems, a detailed friction model, for example, a friction model according to Dahl, is used to describe the friction. The following equations hold:

$$M_f(\dot{\varphi}) = \sigma_0 z + D\dot{\varphi}$$

$$\dot{z} = \dot{\varphi} - \frac{\sigma_0}{M_{coul}} z |\dot{\varphi}|$$

where $\sigma_0 z$ is the nonlinear component. Alternatively, it would also be possible to differentiate between static friction and dynamic friction.

Figure 2:
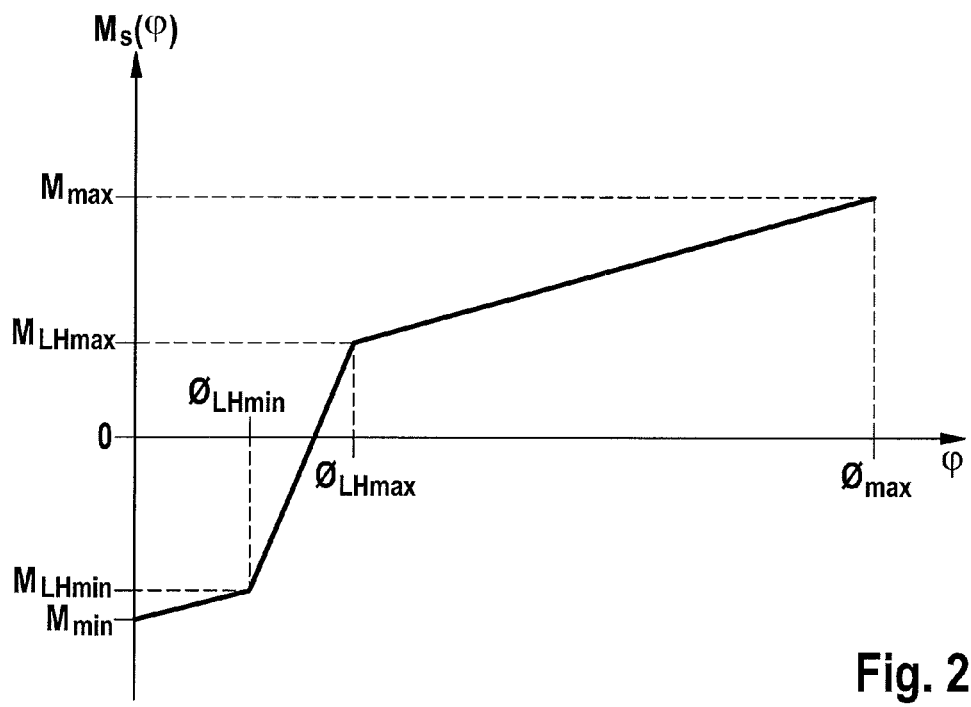
FIG. 2 shows a diagram to illustrate a spring characteristic curve for a return spring of the position transducer system of FIG. 1.

With regard to the return spring, it is necessary to take into account whether the return spring has a spring constant which, depending on the deflection or the position of actuator 2, is nonlinear. The return springs in throttle devices are typically provided with an increased spring constant in the range of a zero to be able to ensure a reliable return to a certain basic position in the event of loss of a trigger moment. However, the spring force is 0 at the zero itself. An exemplary curve of the spring constants or the response of the return spring on actuator 2 is represented in the diagram in FIG. 2, where it holds:

$$M_s(\varphi) = M_{slin}(\varphi) + M_{sNL}(\varphi)$$

$$M_{slin}(\varphi) = C_s \varphi$$

where $M_{slin}(\varphi)$ corresponds to the linear component and $M_{sNL}(\varphi)$ corresponds to the nonlinear component of the above differential equation describing the friction behavior. In the diagram in FIG. 2, $M_{max}$ corresponds to the greatest possible restoring moment, $M_{min}$ corresponds to the smallest possible restoring moment, $\Phi_{max}$ corresponds to the maximum deflection of the return spring, $M_{LHmin}$ determines the restoring moment at a control angle $\Phi_{LHmin}$ and $M_{LHmax}$ determines the restoring moment at a control angle $\Phi_{LHmax}$, the spring characteristic curve between $M_{LHmin}$ and $M_{LHmax}$ having an increased slope.

In the description of position transducer system 1 above, the friction model used and the model of the return spring having a nonlinear response result in a nonlinear differential equation system.

The model described by the nonlinear differential equation is divided below into a linear component and a nonlinear component.

The equations above yield the following differential equation:

$$U = \frac{LJ}{C_m K_{gear}} \dddot{\varphi} + \frac{RJ + LD}{C_m K_{gear}} \ddot{\varphi} + \left( C_m K_{gear} + \frac{RD + LC_s}{C_m K_{gear}} \right) \dot{\varphi} + \frac{RC_s}{C_m K_{gear}} \varphi + \frac{RM_{sNL}(\varphi)}{C_m K_{gear}} + \frac{RM_{fNL}(\dot{\varphi})}{C_m K_{gear}} + \frac{RA(p_{pre} - p_{post})}{C_m K_{gear}}$$

A division into a linear component U* and a nonlinear component $U_{nonlinear}$ according to $U = U^* + U_{nonlinear}$ yields:

$$U^* = U - \frac{RM_{sKL}(\varphi)}{C_m K_{gear}} - \frac{RM_{fNL}(\dot{\varphi})}{C_m K_{gear}} - \frac{RA(p_{pre} - p_{post})}{C_m K_{gear}}$$

$$U^* = \frac{LJ}{C_m K_{gear}} \dddot{\varphi} + \frac{RJ + LD}{C_m K_{gear}} \ddot{\varphi} + \left( C_m K_{gear} + \frac{RD + LC_s}{C_m K_{gear}} \right) \dot{\varphi} + \frac{RC_s}{C_m K_{gear}} \varphi$$

The nonlinear component then corresponds to $$U_{nonlinear} = -\frac{RM_{sNL}(\varphi)}{C_m K_{gear}} - \frac{RM_{fNL}(\dot{\varphi})}{C_m K_{gear}} - \frac{RA(p_{pre} - p_{post})}{C_m K_{gear}}$$

The linear part of the differential equation is now discretized below according to a discretization method. This may be carried out with the aid of Tustin's method. The Tustin transformation is based on a Laplace transformation and a transformation according to $$s \leftarrow \frac{2}{dT} \frac{z-1}{z+1}$$

After the Laplace transformation, the linear differentiation equation yields:

$$\frac{\Phi(s)}{U^*(s)} = \frac{1}{\frac{LJ}{C_m K_{gear}} s^3 + \frac{RJ + LD}{C_m K_{gear}} s^2 + \left(C_m K_{gear} + \frac{RD + LC_s}{C_m K_{gear}}\right) s + \frac{RC_s}{C_m K_{gear}}}$$

According to the Tustin transformation, this yields:

$$G(s) = \frac{1}{as^3 + bs^2 + cs + d}$$

where $$a = \frac{LJ}{C_m K_{gear}}$$

$$b = \frac{RJ + LD}{C_m K_{gear}}$$

$$c = C_m K_{gear} + \frac{RD + LC_s}{C_m K_{gear}}$$

$$d = \frac{RC_s}{C_m K_{gear}}$$

and $$G(z) = \frac{\alpha + 3\alpha z^{-1} + 2\alpha z^{-2} + \alpha z^{-3}}{1 + \beta z^{-1} + \gamma z^{-2} + \delta z^{-3}}$$

where $\{\alpha, \beta, \gamma, \delta\} = f(a, b, c, d, dT)$, and where $$a_1 = \frac{8a}{dT^3}$$

$$b_1 = \frac{4b}{dT^2}$$

$$c_1 = \frac{2c}{dT}$$

$$\alpha = \frac{1}{a_1 + b_1 + c_1 + d}$$

$$\beta = \alpha(-3a_1 - b_1 + c_1 + 3d)$$

$$\gamma = \alpha(3a_1 - b_1 - c_1 + 3d)$$

$$\delta = -\gamma - \beta - 1 + 8ad$$

Tustin's discretization has the advantage that it yields computation models having simple computation rules, which may be calculated easily using microprocessors having a comparatively low computation capacity. In particular, the discretized computation model does not contain any exponential equations or the like.

However, Tustin's discretization results in a leading of the discretization results, which may be compensated to improve the results. This compensation may be carried out by providing an approximated delay of dT/2 according to:

$$H(z) = \frac{z+1}{2z} = \frac{1+z^{-1}}{2}$$

It holds that $$U^* = U - \frac{RM_{sNL}(\varphi)}{C_m K_{gear}} - \frac{RM_{fNL}(\dot{\varphi})}{C_m K_{gear}} - \frac{RA(p_{pre} - p_{post})}{C_m K_{gear}}$$

$$u_1(t_k) = U^*(t_k) + 3U^*(t_{k-1}) + 3U^*(t_{k-2}) + U^*(t_{k-3})$$

$$\tilde{u}(t_k) = \frac{u_1(t_k) + u_1(t_{k-1})}{2}$$

$$\varphi(t_k) = \alpha \tilde{u}(t_k) - \beta \varphi(t_{k-1}) - \gamma \varphi(t_{k-2}) - \delta \varphi(t_{k-3})$$

with these as initial conditions:
If $|\dot{\varphi}(t_k)| \geq \dot{\varphi}_{coul}$ then $M_{sNL}(\dot{\varphi}(t_k)) = M_{coul}\text{sign}(\dot{\varphi})$; and
if $\varphi(t_k) \geq \varphi_{LHmax}$ and $\varphi(t_k) < \varphi_{max}$ then $M_{sNL}(\dot{\varphi}(t_k)) = M_0$ These simplify the above equations as follows:

$$u^* = u(t_k) - \frac{RM_0}{C_m K_{gear}} - \frac{RM_{coul}}{C_m K_{gear}} \text{sign}(\dot{\varphi}) - \frac{RA(p_{pre} - p_{post})}{C_m K_{gear}}$$

$$u_1(t_k) = u^*(t_k) + 3u^*(t_{k-1}) + 3u^*(t_{k-2}) + u^*(t_{k-3})$$

$$\tilde{u}(t_k) = \frac{u_1(t_k) + u_1(t_{k-1})}{2}$$

$$\varphi(t_k) = \alpha \tilde{u}(t_k) - \beta \varphi(t_{k-1}) - \gamma \varphi(t_{k-2}) - \delta \varphi(t_{k-3})$$

$$u^*(t_k) = u(t_k) - \frac{\eta}{8\alpha} - \frac{\mu}{\alpha} \cdot v_2(t_k) - \frac{\kappa}{\alpha} v_1(t_k)$$

$$\tilde{u}_1(t_k) = \frac{u^*(t_k) + 4u^*(t_{k-1}) + 6u^*(t_{k-2}) + 4u^*(t_{k-3}) + u^*(t_{k-4})}{2}$$

$$\varphi(t_k) = \alpha \tilde{u}_1(t_k) - \beta \varphi(t_{k-1}) - \gamma \varphi(t_{k-2}) - \delta \varphi(t_{k-3})$$

where $$v_1(t_k) = A(p_{pre} - p_{post})$$

$$v_2(t_k) = \text{sign}(\dot{\varphi})$$

$$\rho = \frac{\alpha R}{C_m K_{gear}}$$

$$\mu = \rho M_{coul}$$

$$\eta = 8\rho M_0$$

$$\kappa = \rho A$$

$$\tilde{u}(t_k) = \frac{u(t_k)\{+4U(t_{k-1}) + 6u(t_{k-2}) + 4u(t_{k-3}) + u(t_{k-4})}{2}$$

$$\tilde{v}_1(t_k) = \frac{v_1(t_k) + 4v_1(t_{k-1}) 6v_1(t_{k-2}) + 4v_1(t_{k-3}) + v_1(t_{k-4})}{2}$$

$$\tilde{v}_2(t_k) = \frac{v_2(t_k) + 4v_2(t_{k-1}) + 6v_2(t_{k-2}) + 4v_2(t_{k-3}) + v_2(t_{k-4})}{2}$$

$$\varphi(t_k) = \alpha \tilde{u}(t_k) - \mu \tilde{v}_2(t_k) - \kappa \tilde{v}_1(t_k) - \beta \varphi(t_{k-1}) - \gamma \varphi(t_{k-2}) - \delta \varphi(t_{k-3}) - \eta$$

Figure 3:
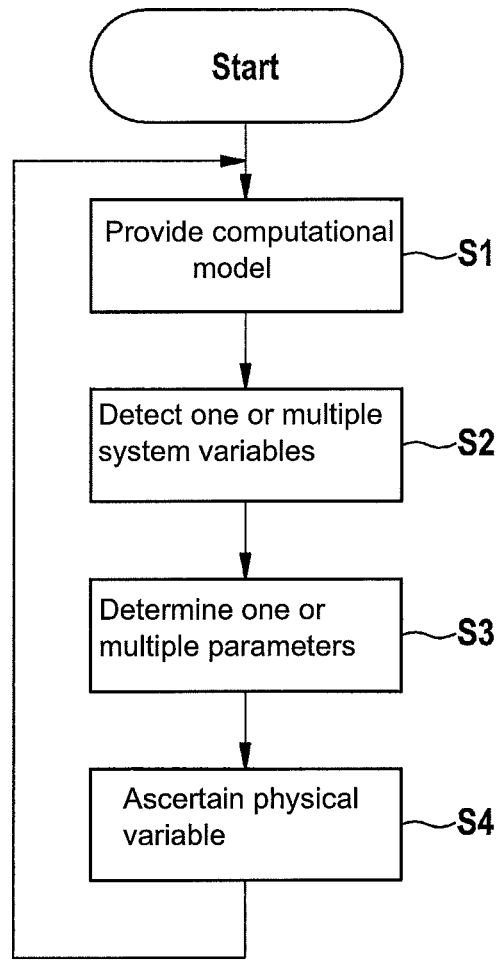
FIG. 3 shows a flow chart to illustrate the method for determining a physical variable of the position transducer system of FIG. 1.

A method for determining a physical variable from the above computation model is described below on the basis of the flow chart in FIG. 3.

After the computation model has been provided in step S1, corresponding parameters $\alpha$, $\mu$, $\kappa$, $\beta$, $\gamma$, $\delta$, $\eta$ and, from these, parameters a, b, c, d are calculated anew regularly, i.e., at predefined points in time or in real time. For this purpose, in step S2, one or multiple system variable(s) (state variables) are detected at a certain point in time and, from them, one or multiple of parameter(s) α, μ, κ, β, γ, δ, η and, from them, a, b, c, d are determined in step S3 with the aid of the computation model. This may then take place through suitable transformation of the above discretized differential equation.

Depending on the number of parameters α, μ, κ, β, γ, δ, η to be determined, it may be necessary to determine the one or the multiple system variable(s) at two or more than two points in time or at two or more than two operating points. For this purpose, a history of the detected system variables may be stored in a suitable manner. For seven parameters α, μ, κ, β, γ, δ, η to be determined above, it is sufficient to determine the successive values of system variables $\phi(t_k)$ and $\tilde{\mu}(t_k)$ detected most recently. Parameters α, μ, κ, β, γ, δ, η may be ascertained, for example, by applying a recursive method (a recursive least squares method or a gradient method).

$$\phi(t_k) = \alpha \tilde{u}(t_k) - \mu \tilde{v}_2(t_k) - \kappa \tilde{v}_1(t_k) - \beta \phi(t_{k-1}) - \gamma \phi(t_{k-2}) - \delta \phi(t_{k-3}) - \eta$$

$$\phi(t_{k-1}) = \alpha \tilde{u}(t_{k-1}) - \mu \tilde{v}_2(t_{k-1}) - \kappa \tilde{v}_1(t_{k-1}) - \beta \phi(t_{k-2}) - \gamma \phi(t_{k-3}) - \delta \phi(t_{k-4}) - \eta$$

$$\phi(t_{k-2}) = \alpha \tilde{u}(t_{k-2}) - \mu \tilde{v}_2(t_{k-2}) - \kappa \tilde{v}_1(t_{k-2}) - \beta \phi(t_{k-3}) - \gamma \phi(t_{k-4}) - \delta \phi(t_{k-5}) - \eta$$

$$\phi(t_{k-3}) = \alpha \tilde{u}(t_{k-3}) - \mu \tilde{v}_2(t_{k-3}) - \kappa \tilde{v}_1(t_{k-3}) - \beta \phi(t_{k-4}) - \gamma \phi(t_{k-5}) - \delta \phi(t_{k-6}) - \eta$$

By solving this equation system, parameters α, μ, κ, β, γ, δ, η may be determined as average values for the period of time $t_{k-6}$ to $t_k$. If, for determining parameters α, μ, κ, β, γ, δ, η for the computation model, a determination of the time derivation $\dot{\phi}$ of the position of actuator 2 is not directly possible from the measurement or if it is too inaccurate because of quantization effects, for example, then time derivation $\dot{\phi}$ of the position of actuator 2 may be simulated by using a model.

Any physical variable used in the computation model, namely winding resistance R, inductance L of the winding, engine constant $C_m$, gear ratio $K_{gear}$ a winding temperature T, moment of inertia J and winding current I may be ascertained in step S4 from the parameters thereby ascertained.

After step S4, the program jumps back to S1 and steps S1 through S4 are carried out again.

If, for example, a current picked up by position transducer drive 3 is to be ascertained, but a direct current measurement is not carried out, then under the assumption that spring constant $C_s$ is known, e.g., by measurement before installation or before starting operation, equation systems for inductance L, for moment of inertia J, for parameters $C_m$, $K_{gear}$, resistance R and viscous friction coefficient D may be derived from parameters a, b, c, d. Disregarding the viscous friction coefficient D, this yields the following equations in simplified form:

$$C_m K_{gear} = c - \frac{ad}{b}$$

$$R = \frac{d}{C_s}\left(c - \frac{ad}{b}\right)$$

$$L = \frac{ad}{bC_s}\left(c - \frac{ad}{b}\right)$$

If D is not to be disregarded and has been ascertained elsewhere, this yields $$J = \frac{b \pm \sqrt{b^2 - \frac{4daD}{C_s}}}{\frac{2d}{C_s}}$$

$$R = \frac{d}{C_s}\left(c - \frac{Dd}{C_s} + \frac{aCs}{J}\right)$$

$$C_m K_{gear} = \frac{RCs}{d}$$

$$L = \frac{aC_m K_{gear}}{J}$$

To determine amperage I, the differential equation $$U = RI + L\dot{I} + C_m K_{gear} \dot{\phi}$$

must be solved in the usual way.

If the temperature of the position transducer, in particular position transducer drive 3, is to be determined as a physical variable, then by using an allocation function, the temperature may be assigned to the values of the parameters or to the physical variables ascertained from them with the aid of a lookup table, for example, or an allocation function or the like. The lookup table or the allocation function may be prepared, for example, before starting operation, e.g., by heating the position transducer system 1 to a certain temperature and ascertaining the parameter combinations of parameters α, β, γ, δ and a, b, c, d or physical variables R, L ascertained from them. Measurements may therefore be carried out at different temperatures of the actuator, and the relationship between the temperature and individual parameters a through d may be determined offline. In other words:

$$T = f_a(a) = f_b(b) = f_c(c) = f_d(d)$$

The parameters of the computation model determined in real time are used as inputs into inverted functions $f^{-1}_a$, $f^{-1}_b$, $f^{-1}_c$, . . . to thereby ascertain the temperature. The more functions that are available and the more these functions are monotonic, the greater is the accuracy of the calculated temperature.

What is claimed is:

1. A method for operating a position transducer system, comprising:
    providing, using a control unit of the position transducer system, a computation model, which maps a response of the position transducer system, the computation model including a model function and one or multiple parameters;
    ascertaining, using a position sensor of the position transducer system, a value of at least one system variable at multiple points in time;
    determining, using the control unit, the parameters of the computation model from one or multiple values of the at least one system variable determined at different points in time;
    determining, using the control unit, a value of a physical variable at at least one of the multiple points in time as a function of the one or the multiple determined parameters; and
    providing, using the control unit, a control signal to a position transducer drive of the position transducer system as a function of the determined value of the physical variable.

2. The method according to claim 1, wherein a position of an actuator or an electric trigger variable that is a trigger voltage of the position transducer drive of the position transducer system is used as the at least one system variable.

3. The method according to claim 1, wherein a temperature or a current in a position transducer drive of the position transducer system is determined as the physical variable.

4. The method according to claim 1, wherein the parameters are determined anew at regular intervals in real time.

5. The method according to claim 1, wherein the physical variable is determined with the aid of an allocation function from the determined parameters.

6. The method according to claim 1, wherein one or multiple additional physical variables are determined from the one or the multiple parameters, wherein the physical variable to be determined is determined with the aid of the additional physical variables and a discretized linear differential equation.

7. The method according to claim 1, further comprising conducting a plausibility check of the position transducer system using the determined value of the physical variable, wherein the providing the control signal to the position transducer drive is a function of the plausibility check.

8. The method according to claim 1, further comprising calculating, using the control unit, a positioning rate of the position transducer system using the determined value of the physical variable.

9. A control unit for operating a position transducer system, wherein the control unit is configured to:
provide a computation model which maps a response of the position transducer system, the computation model including a model function and one or multiple parameters;
ascertain, using a sensor of the position transducer system, a value of at least one system variable at multiple points in time;
determine the parameters of the computation model from one or multiple values of the at least one system variable ascertained at different points in time;
determine a value of a physical variable at at least one of the multiple points in time as a function of the one or the multiple determined parameters; and
provide a control signal to a position transducer drive of the position transducer system as a function of the determined value of the physical variable.

10. The control unit according to claim 9, further configured to conduct a plausibility check of the position transducer system using the determined value of the physical variable, wherein the providing the control signal to the position transducer drive is a function of the plausibility check.

11. The control unit according to claim 9, further configured to calculate a positioning rate of the position transducer system using the determined value of the physical variable.

12. The control unit according to claim 9, wherein a position of an actuator or an electric trigger variable that is a trigger voltage of the position transducer drive of the position transducer system is used as the at least one system variable.

13. The control unit according to claim 9, wherein a temperature or a current in the position transducer drive of the position transducer system is determined as the physical variable.

14. A non-transitory machine-readable storage medium having program code, which when executed on a processing device carries out a method for operating a position transducer system, the method comprising:
providing, using a control unit of the position transducer system, a computation model, which maps a response of the position transducer system, the computation model including a model function and one or multiple parameters;
ascertaining, using a sensor of the position transducer system, a value of at least one system variable at multiple points in time;
determining, using the control unit, the parameters of the computation model from one or multiple values of the at least one system variable determined at different points in time;
determining, using the control unit, a value of a physical variable at at least one of the multiple points in time as a function of the one or the multiple determined parameters; and
providing, using the control unit, a control signal to a position transducer drive of the position transducer system as a function of the determined value of the physical variable.

15. The non-transitory machine-readable storage medium according to claim 14, the method further comprising conducting a plausibility check of the position transducer system using the determined value of the physical variable, wherein the providing the control signal to the position transducer drive is a function of the plausibility check.

16. The non-transitory machine-readable storage medium according to claim 14, the method further comprising calculating, using the control unit, a positioning rate of the position transducer system using the determined value of the physical variable.

17. The non-transitory machine-readable storage medium according to claim 14, wherein a position of an actuator or an electric trigger variable that is a trigger voltage of the position transducer drive of the position transducer system is used as the at least one system variable.

18. The non-transitory machine-readable storage medium according to claim 14, wherein a temperature or a current in the position transducer drive of the position transducer system is determined as the physical variable.

* * * * *